United States Patent [19]

Pravettone

[11] 4,442,567

[45] Apr. 17, 1984

[54] DUST PAN AND REFUSE CONTAINER

[76] Inventor: John P. Pravettone, 23807 Karen, Warren, Mich. 48091

[21] Appl. No.: 425,590

[22] Filed: Sep. 28, 1982

Related U.S. Application Data

[63] Continuation of Ser. No. 171,976, Jul. 24, 1980, Pat. No. 4,357,728.

[51] Int. Cl.$^3$ .............................................. A47L 13/52
[52] U.S. Cl. ................................. 15/257.4; 15/257.9; 141/108; 248/98; 248/99; 280/47.35
[58] Field of Search ................. 15/257.1, 257.4, 257.6, 15/257.7, 257.9; 248/98, 99; 141/314, 316, 108; 280/47.13, 47.2, 47.35; D12/15

[56] References Cited

U.S. PATENT DOCUMENTS

| | | | |
|---|---|---|---|
| 178,886. | 6/1876 | Tandy | 248/98 |
| 430,355 | 6/1890 | Stone | 141/314 X |
| 808,739 | 1/1906 | Focht | 280/47.35 X |
| 1,067,888 | 7/1913 | Thresher | 141/314 X |
| 1,266,522 | 5/1918 | Oldham | 141/314 X |
| 1,536,903 | 5/1925 | McNaughton | 248/98 |
| 2,818,988 | 1/1958 | Dunkin | 280/47.2 X |
| 2,992,011 | 7/1961 | Becan | D12/24 |
| 3,106,303 | 10/1963 | Finocchiaro | 15/257.1 X |
| 3,170,183 | 2/1965 | Leatherman | 15/257.1 |
| 3,697,030 | 10/1972 | Schultz | 15/257.1 X |
| 3,806,146 | 4/1974 | Shaw | 248/98 X |
| 3,875,981 | 4/1975 | Brenner | 249/98 X |
| 3,934,803 | 1/1976 | Paulus | 15/257.1 X |
| 4,006,928 | 2/1977 | Beugin | 15/257.1 X |
| 4,052,764 | 10/1977 | Groff | 248/99 X |

FOREIGN PATENT DOCUMENTS 1108917  11/1982  France ............................ 15/257.4

*Primary Examiner*—Edward L. Roberts
*Attorney, Agent, or Firm*—Remy J. VanOphem

[57] ABSTRACT

The present specification discloses a combination dust pan and refuse container constructed of inexpensive lightweight materials which is highly transportable and repositionable from an upright refuse transporting position to a horizontal refuse collecting position. The combination dust pan and container is made up of a framework which distends and substantially encloses a conventional disposable trash bag, four circumferentially spaced ground contacting wheels and a dust pan which depends outwardly from the frame near the mouth of the bag. In the transporting position, all four wheels contact the ground and provide a stable base. In the collecting position, the outermost edge of the dust pan and two of the wheels which are on a common axle contact the ground. A handle is provided which projects upwardly in both the transporting and collecting positions to facilitate mobility of the pan/container combination. In the preferred embodiment of the invention, mesh type supporting frames are included for heavy duty application and enhanced bag protection. In the alternative embodiment of the invention, the features of a collapsible container and a dimensionally adjustable framework are disclosed.

20 Claims, 4 Drawing Figures

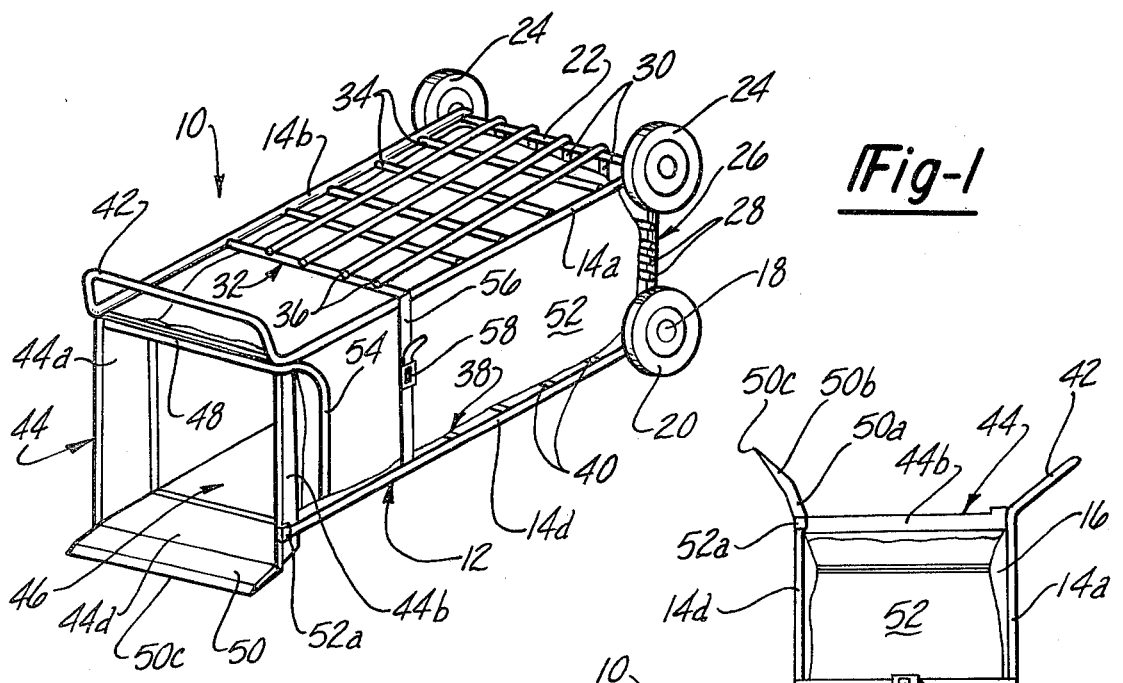
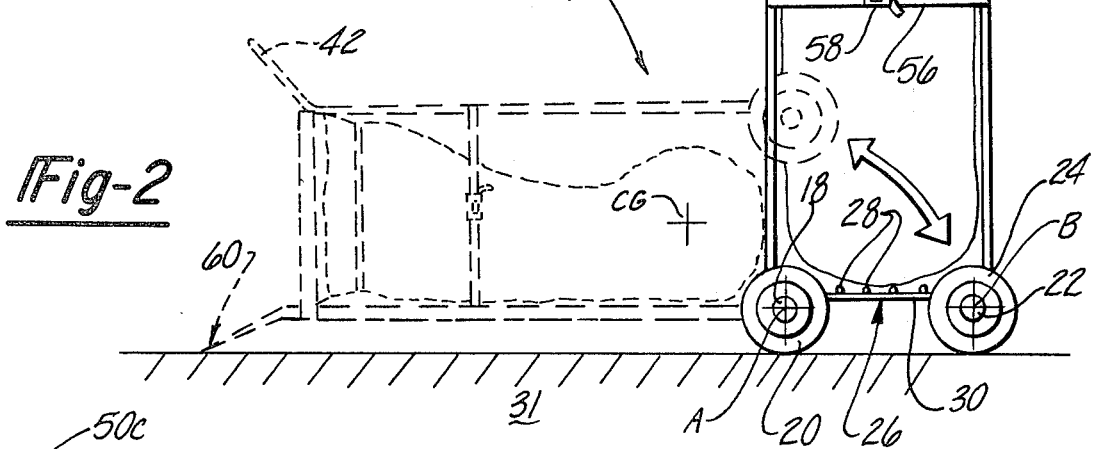
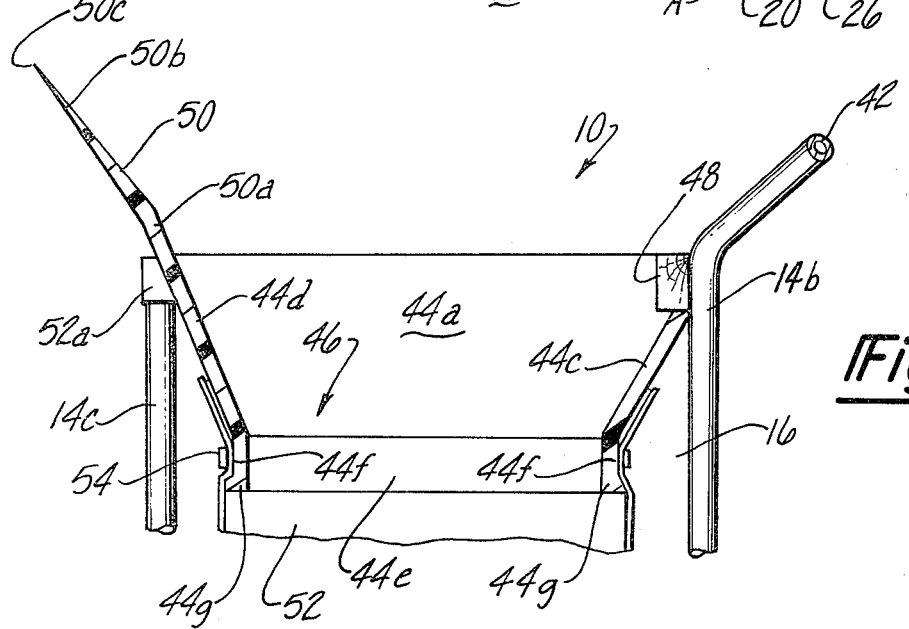

DUST PAN AND REFUSE CONTAINER

CROSS-REFERENCE

This is a continuation of application Ser. No. 171,976, filed July 24, 1980, now U.S. Pat. No. 4,357,728 issued Nov. 9, 1982.

INTRODUCTION

The present invention generally relates to containers for the collection of refuse, trash, leaves and the like. More particularly, the present invention relates to such containers which employ conventional disposable plastic trash bags and are intended for household application by the general consuming public.

BACKGROUND OF THE INVENTION

Any number of containers, collectors and transporters for refuse such as garbage, leaves, grass clippings and the like have been suggested and commercialized in the past. These range from commercial units weighing hundreds of pounds and requiring special transport trucks, to widely marketed inexpensive consumer oriented products. The generally available commercial units typically prove to be unacceptable for household applications due to size and, more importantly, weight and cost considerations. Containers which are structurally sounds, versatile and convenient to use are generally cost ineffective for household type applications. Additionally, units designed for commercial application are often unsatisfactory for household use inasmuch as they are structurally complex and may be hazardous to an untrained user.

Refuse containers for noncommerical or household applications which are inexpensive and relatively easy to employ abound. However, such prior art containers often have a number of shortcomings. Many containers which have received consumer acceptance attribute success only to mass marketing such as through television and newspaper advertising rather than through engineering and design excellence. Such containers often are not well engineered and employ inferior or substandard materials. Additionally, such consumer oriented prior art containers are often intended for only a single light duty application such as collecting leaves and are totally unacceptable for others such as receiving relatively heavy grass clippings either from thatching or mowing the lawn. A consumer is often tempted to use the container for other nonintended applications, causing it to break outright or substantially lessen its useful life. Finally, single application containers often are not adjustable to accommodate disposable trash bags of varying dimensions and volumes.

Many refuse containers intended for home use, although inexpensive, are extremely difficult to use and result in a net loss of efficiency. For example, prior art frames for use in distending conventional disposable plastic garbage bags or the like are made up of a number of separate wire members which must be assembled and locked into position each time the container is to be used or repositioned. In addition to being awkward, such containers, by virtue of their many separate parts tend to be rendered useless through loss of one or more of the parts. Additionally, such devices can be hazardous inasmuch as the members are often pivotally mounted to one another and may have sharp edges resulting in finger catching "scissor-type" action as they are being deployed or disassembled.

An additional problem common to consumer type refuse containers is their lack of mobility both during and after collection of refuse. Prior art designs are often unstable unless they are staked into the ground. Such devices inherently require uprooting each time the user desires to move it from one location to another in the process of collecting refuse. This can be extremely difficult in applications such as raking leaves wherein relatively frequent repositioning of the container is required. An additional shortcoming of such a device is its stability in only a single orientation i.e. the collection, position, but not in the transporting position. This problem is particularly aggravated in situations when the container is full or nearly full of relatively heavy refuse. A related problem is that the bag is not fully supported in the transporting position and thus is susceptible to becoming detached from the frame or being ripped and thereby spilling the contents.

Finally, many prior art devices fail to provide versatility for the aged or physically infirm wherein the design allows the user to apply mechanical advantage thereto in repositioning it from the refuse collecting position to the transporting position. Most prior art devices require that the user bear the full weight of the container as well as its contents.

Representative of the best prior art are U.S. Pat. Nos. 3,106,303 to Finocchiaro, 3,170,183 to Leatherman, 3,697,030 to Schultz, 3,934,803 to Paulus, Jr., and 4,006,928 to Beugin. The devices disclosed in these patents, although being useful in their specific intended applications, are chosen to collectively represent some of the above discussed shortcomings of the prior art as a whole.

U.S. Pat. No. 3,170,183 discloses a one piece dust pan and basket combination which is constructed of plastic to provide a sweeping kit which enables dirt or the like to be swept directly into a retention receptacle without the use of an additional dust pan. Two slots are provided in the receptacle which act as a hand grip for carrying the receptacle while in the dirt collecting position. The waste basket can be positioned upright for retaining refuse or tipped over on its side for receiving the dirt.

U.S. Pat. Nos. 3,934,803, 3,697,030 and 4,006,928 disclose frame-type refuse collectors which distend and coact with a collapsible garbage bag and permit sweeping of refuse directly into the mouth of the bag which is held open by the frame.

U.S. Pat. No. 3,106,303 disclose a collapsible cart for collecting relatively light and bulky refuse and allows transporting thereof through supportive wheels.

BRIEF DESCRIPTION OF THE INVENTION

The present invention relates to a portable dust pan and refuse container combination which overcomes the above described shortcomings of the prior art by providing a highly portable, stable, yet inexpensive and lightweight container which employs an open mouthed, elongated flexible collection bag which is easily installed with and removed from the rest of the container. According to the present invention, the dust pan and refuse container combination includes a bag supporting frame which distends and substantially encloses the bag, means which holds the mouth of the bag rigidly open for receiving refuse, two or more spaced, ground contacting wheels which are rotatably mounted to the frame of a common axis to permit selective rotational repositioning of the frame of a common axis to permit selective rotational repositioning of the frame about the axis from a first, substantially vertical refuse transporting position, to a second, substantially horizontal refuse collecting position and, finally, a dust pan which depends from the frame adjacent the mouth of the bag and projects angularly outwardly therefrom with respect to the line of elongation of the bag and which operates to abut the ground when the container is in the second position. This arrangement has the advantage of providing an inexpensive yet extremely strong, stable and highly mobile refuse collector and container which is very efficient and convenient to use in the collection of refuse while requiring a minimum of physical exertion both in transporting the container from a storage area such as the garage to the area of use such as the lawn and in transitioning the container between the first and second positions and back to the first position when the container is full of refuse.

According to the preferred embodiment of the invention, a handle is provided integrally with the frame which depends substantially outwardly therefrom both in the first and second positions. This arrangement has the advantage of allowing the user to readily grasp and reposition the container either from the sides or while addressing the container from the end holding the mouth of the bag. Additionally, this same handle facilitates pushing the container once fully loaded to an area for dumping of the refuse or removal of the bag from the frame.

According to another aspect of the invention, an additional pair of wheels are provided which are rotationally mounted on the frame on a second axis which is parallel to but spaced from the common axis and operative to coact with the first pair of wheels to support the container when in the first or upright position. This arrangement has the advantage of providing a container whose weight is fully supported on wheels when in the upright position.

According to another aspect of the present invention, first and second opposed side guard members are provided which depend angularly outwardly from the frame and coact with the dust pan to define a converging refuse guiding entrance to the mouth. This arrangement has the advantage of providing efficient acceptance of refuse from a direction angularly offset with the line of elongation of the bag and prevents spillage from around the mouth of the bag.

According to another aspect of the invention, the dust pan and refuse container is collapsible and adjustable to accommodate trash bags of varying dimensions and capacities. This arrangement has the advantage of providing a convenient, flexible container which collapses to minimize storage volume requirements by employing constituent elements (structural members) which operatively (pivotally) engage one-another.

According to still another aspect of the invention, the dust pan projects outwardly further than the side guard members mentioned herein above and includes a ground embracing edge at the outer terminus thereof. This extended portion acts as a cantilever as it bears against the ground thereby preventing refuse from escaping underneath the edge when a refuse collecting instrument such as a rake is passed toward the mouth of the bag and otherwise may catch the underside of the ground embracing edge.

These and other features and advantages of this invention will become apparent upon reading the following specification, which, along with the patent drawings, describes and discloses a preferred illustrative embodiment and an alternative embodiment of the invention in detail.

The detailed description of the specific embodiment makes reference to the accompanying drawings:

BRIEF DESCRIPTION OF THE DRAWINGS

FIGS. 1 is a perspective view of the preferred embodiment of the inventive dust pan and refuse container illustrated in its first or refuse collecting position;

FIG. 2 is a side plan view of the dust pan and refuse container of FIG. 1 illustrating the container in its first or upright position (solid line) and in its second or refuse collection position (dotted line);

FIG. 3 is a fragmented cross-sectional view of the dust pan and refuse container of FIG. 1 shown on an enlarged scale.

DETAILED DESCRIPTION OF THE PREFERRED EMBODIMENT

Figure 4:
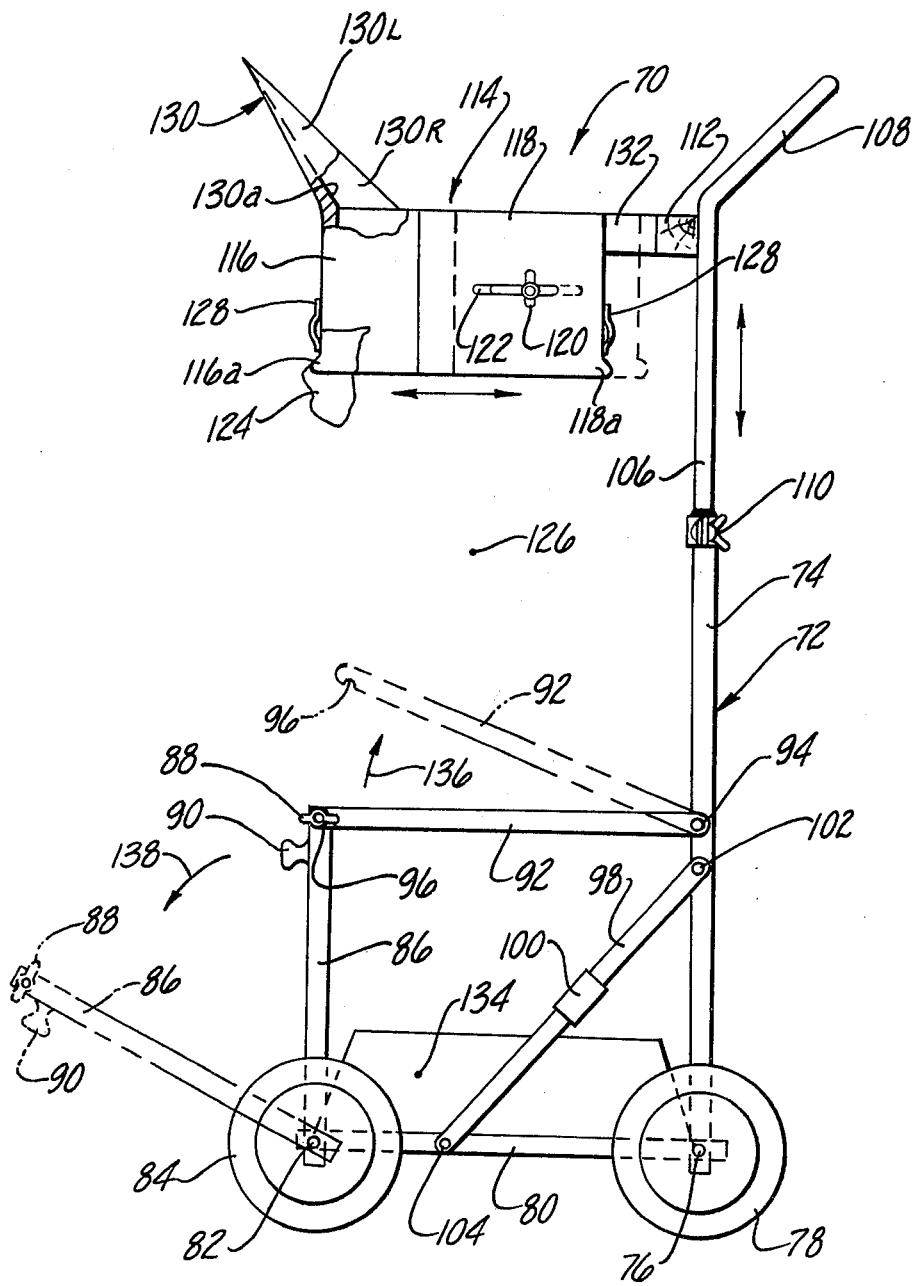
FIG. 4 is a side plan view of an alternative embodiment of the inventive dust pan and refuse container in an enlarged scale.

Referring to drawings FIGS. 1 through 3, a preferred embodiment of a combination dust pan and refuse container 10 (hereinafter referred to as container) is illustrated. Although the container 10 is principally intended for consumer or household type applications, it is contemplated that it could also be employed for many commercial or industrial applications. The specific use for the container 10 contemplated by the applicant is an aid in gathering, transporting and storing refuse or items which are scattered on the ground such as grass clippings, thatch, dust, dirt, leaves and the like.

The container 10 includes a bag supporting frame 12 made up of four substantially parallel spaced elongated members 14a, 14b, 14c, and 14d. The parallel spaced elongated members 14a through 14d collectively define the edges of a refuse bag nesting area 16. The parallel spaced elongated members 14c and 14d are interconnected by a rigidly fixed axle 18 which projects laterally outwardly therefrom in both directions to rotatably support a first pair of ground contacting wheels 20. Although only one wheel 20 is illustrated, it is to be understood that the container 10 is substantially symmetrical and a second wheel 20 (not illustrated) is rotatably mounted on the opposite end of the axle 18. The axle 18 defines a first rotational axis designated A. Likewise, the parallel spaced elongated members 14a and 14b are interconnected by a second axle 22 which is affixed therebetween and extends laterally therebeyond to rotatably support a second pair of ground contacting wheels 24. The axles 18 and 22 therefore act as structural members which maintain the spaced parallel elongated members 14a through 14d in their illustrated laterally fixed spaced relationship.

Longitudinal (between wheels 20 and 24) structural support is provided by a bottom bag supporting frame 26 which is interconnected between the axles 18 and 22 and is constructed from a wire mesh having a number of parallel lateral members 28 and a number of parallel longitudinal members 30 at right angles to the parallel lateral members 28 and welded thereto to form a mesh or grate which is rigidly affixed to the remainder of the frame 12. The axle 22 defines a second axis B which is substantially parallel to and spaced from the axis A.

When the container 10 is in its upright or first position as illustrated in FIG. 3, the wheels 20 and 24 will all be contacting the ground designated 31 to provide a stable support therefor and permit a high degree of mobility by virtue of the rotational mounting of the wheels 20 and 24 upon the axles 18 and 22.

Lateral structural support of the container 10 is also supplied by an upper bag supporting frame 32 which, like the bottom bag supporting frame 26 is a mesh formed of a number of parallel lateral members 34 affixed normally to a number of substantially parallel vertical members 36. The lateral members 34 are fixedly spaced between the spaced parallel elongated members 14a and 14b of the frame 12. A lower bag supporting frame 38 is substantially identical to the upper bag supporting frame 32, including a number of parallel lateral members 40 interconnecting the spaced parallel elongated members 14c and 14d of the frame 12 normally affixed to a number of vertical members (not illustrated). The vertical members of the lower bag supporting frame 38 are singularly integrally formed with the associated longitudinal members 30 of the bottom bag supporting frame 26 and the parallel vertical members 36 of the upper bag supporting frame 32, i.e. each associated set of longitudinal members (30, 36 and not shown) are formed from a single "C" shaped length of wire.

Referring specifically to FIG. 3, the upper ends of the spaced parallel elongated members 14a and 14b are integrally interconnected by a handle 42 which extends upwardly and rightwardly therefrom. Spacing of the spaced parallel elongated members 14a and 14b is maintained at their ends opposite the wheels 20 and 24 by a bag supporting chute 44 which is constructed of a first pair of spaced angled members 44a and 44b and a second pair of angled members 44c and 44d. The spaced angled member 44a interconnects the upper ends of the spaced parallel elongated members 14b and 14c of the frame 12, the spaced angled member 44b interconnects the spaced parallel elongated members 14a and 14d of the frame 12, the spaced angled member 44c interconnects the spaced parallel elongated members 14a and 14b of the frame 12 and the spaced angled member 44d interconnects the spaced parallel elongated members 14c and 14d of the frame 12. The spaced angled members 44a, 44b, 44c, and 44d collectively define a converging refuse inlet aperture generally designated 46. Additional structural support is provided by a wooden cross member 48 which interconnects the spaced parallel elongated members 14a and 14b of the frame 12 adjacent the point at which the spaced parallel elongated members 14a and 14b transition into the handle 42.

The spaced angled member 44d of the bag supporting chute 44 extends upwardly and leftwardly substantially further than the other members. This extension is defined for the purposes of the present application as a dust pan 50. The dust pan 50 includes a lower portion 50a which transitions with the spaced angled member 44d of the bag supporting chute 44 and has a relatively uniform cross section. The dust pan 50 also includes an upper portion 50b which projects upwardly from the lower portion 50a and has a transitioning cross-sectional area which terminates in a relatively sharp ground embracing edge 50c. In application, the dust pan 50 operates as a cantilever as will be described in detail herein below.

The upper terminus of the spaced parallel elongated members 14c and 14d of the frame 12 are closed by cup shaped plastic caps 52a or the like. The lower most portion of the bag supporting chute 44 extends downwardly defining an extension 44e, the outer circumference of which includes a bag supporting surface 44f. The lower terminus of the bag supporting chute 44 is of increased wall thickness as designated at 44g. An open mouthed, elongated flexible collection bag 52 is disposed within the bag nesting area 16 and has its mouth rigidly held open by the insertion therein of the extension 44e of the bag supporting chute 44. An elastic band 54 passes around the bag 52 near the mouth thereof and embracingly holds the bag 52 against the surface 44f of the bag supporting chute 44. This arrangement causes the bag 52 to be partially distended and contained within the bag nesting area by the influence of the enclosing or surrounding frame 12. In the first or upright position, the bag nesting area 16 is closed on the front (adjacent the dust pan 50) and the back (adjacent the handle 42) sides as well as the bottom by the lower bag supporting frame 38, the upper bag supporting frame 32 and the bottom bag supporting frame 26, respectively. Although the lateral sides of the frame 12 are open, the bag 52 is prevented from escaping therethrough by a pair of bag restraining straps 56. The straps 56 are provided with buckles 58 whereby tension in the straps 56 can be released and the bag 52 removed laterally from the bag nesting area 16 once the elastic band 54 has been released from the mouth area of the bag 52.

Operation of the container 10 can best be understood by referring to FIG. 2 which illustrates the container 10 both in its first or upright substantially vertical refuse transporting position (in solid line) and also in its second, substantially horizontal refuse collecting position (in dotted line). In transporting the container 10, the user walks therebehind and grasps the handle 42, pushing or pulling same. When the container 10 is positioned near refuse that is to be collected, it is then rotated from the first position to the second position about axis A whereby the wheels 24 are rotated counterclockwise to assume a position substantially above the wheels 20. The ground embracing edge 50c of the dust pan 50 will contact the ground 31 and will firmly bear there against by virtue of its cantilever design. It has been found that the upper portion 50b will bend slightly at a point indicated by arrow 60 causing a spring action or preload of the dust pan 50 as it bears against the ground 31 to prevent refuse being collected from escaping therebetween. It should be noted that the handle 42 is designed in such a way as to project upwardly, both in the first and second positions of the container 10, and thereby facilitates movement of the container 10 and transitioning thereof between the positions. Additionally, when all of the refuse in the immediate area has been collected but more remains at a distance, rather than returning the container 10 to the first position, it is contemplated that the handle 42 can be grasped and rotated clockwise upwardly just enough to relieve the preload on the dust pan 50 and then move the container 10 to the new position for collecting additional refuse. This procedure is not recommended for moving the container 10 great distances but only for moving, for example, from one location to another nearby location.

Because of the elongated design of the frame 12, the center of gravity (designated cg) of the combined container 10 and refuse contained therein will be substantially nearer axis A than is the handle 42. As is apparent to one of ordinary mechanical skill and intuition, the handle 42 will provide a substantial mechanical advantage in repositioning the container 10 from the second position back to the first position. Thus, the aged or physically infirmed can employ the container 10 with very little effort. When the bag 52 is full, it is removed by loosening the strap 56 at the buckle 58 and sliding the mouth portion of the bag 52 downwardly away from the bag supporting chute 44 while the elastic band 54 has been stretched radially outwardly. The mouht of the bag 52 can then be closed by conventional ties or other methods and the filled, closed bag can be removed from the bag nesting area 16 by sliding it laterally out of the frame 12.

Referring to FIG. 4, an alternative embodiment of a combination dust pan and refuse container 70 (hereinafter referred to as container) is illustrated. Like the container 10 illustrated in FIGS. 1 through 3, the container 70 is principally intended for consumer or household type applications. The operation of the container 70 is, therefore, identical to that described herein above with a few exceptions as will be described hereinbelow. All of the claimed inventive features can be equally applied to both the preferred embodiment and the alternative embodiment of the invention. Several of the inventive features are described and illustrated in detail only in one of the embodiments of the invention, it being understood that such features are equally applicable to the other embodiment as will be obvious to one of ordinary skill in the art in view of the present specification.

The container 70 includes a bag supporting frame 72 and a conventional compliant, disposable trash or garbage bag. The frame 72 includes substantially parallel laterally spaced elongated members 74, the lower terminus of which are rigidly affixed to a laterally oriented stub axle shaft 76 which retains the parallel laterally spaced elongated members 74 in the illustrated laterally spaced relationship. It should be noted that a reverse plan view of the alternative embodiment of the invention illustrated in FIG. 4 is the exact compliment of FIG. 4 and thus has been omitted for the sake of brevity.

The stub axle shaft 76 extends laterally outwardly beyond the parallel laterally spaced elongated members 74 and rotatably supports the rear (right-hand most) ends of a pair of longitudinally oriented elongated members 80 as well as a pair of ground contacting wheels 78 which are free to rotate about the stub axle shaft 76 but are prevented from axial displacement therealong by entrapment between the parallel laterally spaced elongated member 74 and suitable fastener means at each end of the stub axle shaft 76 such as threaded nuts, cotter pins, swedging or the like. The longitudinally oriented elongated members 80 are of substantially the same extent as are the parallel laterally spaced elongated members 74. A second stub axle shaft 82 passes through aligned apertures in the left-hand most ends of the longitudinally oriented elongated members 80. Like the stub axle shaft 76, the second stub axle shaft 82 projects laterally outwardly beyond the longitudinally oriented elongated members 80 and rotatably supports a second pair of ground contacting wheels 84 between the means and the longitudinally oriented elongated members 80 to prevent axial displacement of the wheels 84 along the second stub axle shaft 82.

The second stub axle shaft 82 passes through a laterally aligned bore within the lower portion of a front bag supporting access door 86, the lateral extent of which interspaces the longitudinally oriented elongated members 80. The access door 86, which is constructed of wood, is free to rotate thereabout unless otherwise restrained. Near the uppermost extent of the lateral surfaces of the access door 86 are a pair of opposed axially aligned thumb screws 88. A knob 90 is affixed to the left-hand most surface of the access door 86. The access door 86 is retained in the illustrated position (solid line) by a pair of longitudinally extending support members 92 which are substantially parallel to one another as well as the longitudinally oriented elongated members 80. The right-hand ends of the longitudinally extending support members 92 are rotatably secured to the parallel laterally spaced elongated member 74 by screws 94 or the like. The left-hand ends of the longitudinally extending support members 92 have downwardly opening notches 96 which, in the assembled (solid line) position cause the left-hand ends of the longitudinally extending support members 92 to be embracingly secured between the access door 86 and the thumb screws 88.

A pair of diagonally oriented members 98 provide rigidity to the bag supporting frame 72. Each diagonally oriented member 98 is articulated by an over center snap acting hinge 100, the structure and operation of which is well known in the art and will not be elaborated upon here. One end of each diagonally oriented member 98 is affixed to its associated parallel laterally spaced elongated member 74 by a screw 102 at a point intermediate the stub axle shaft 76 and the screw 94. The other end of each diagonally oriented member 98 is attached to its associated longitudinally oriented elongated member 80 by means of a screw 104 at a point intermediate the stub axle shafts 76 and 82, respectively.

In their illustrated position, the diagonally oriented members 98 rigidly support the parallel laterally spaced elongated members 74 and the longitudinally oriented elongated members 80 in their illustrated positions. When the longitudinally extending support members 92 are clamped to the access door 86 by the thumb screws 88, the entire assembly is rigid. The longitudinally oriented elongated members 80, the longitudinally extending support members 92 and the diagonally oriented members 98 are constructed of aluminum bar stock having a rectangular cross section. The function of this particular arrangement is described in detail herein below in the description of operation of the alternative embodiment of the invention.

A bottom bag supporting frame (not illustrated) defines a horizontally planar bottom to the supporting frame 72 and is supported by and traverses the lateral space between the longitudinally oriented elongated members 80. The actual structure of the bottom bag supporting frame is substantially indentical to the frame 26 described herein above and illustrated in FIGS. 1 and 2. Likewise, a vertically oriented, planar upper bag supporting frame (not illustrated) is also provided which is supported by and is interspaced between the parallel laterally spaced elongated members 74. The upper bag supporting frame is substantially identical in structure and function to the upper bag supporting frame 32 described herein above and illustrated in FIG. 1. Detailed description of the structure of the frames is deleted here to avoid duplication.

The parallel laterally spaced elongated members 74 are constructed of tubular metal such as aluminum and openly terminate upwardly to telescopingly receive a pair of upper vertical members 106 which are integrally formed from a single piece of slightly smaller aluminum tubing in a generally inverted U-shape configuration, the upper terminus of which defines a handle 108 which extends upwardly and rightwardly therefrom. A thumb screw clamp 110 is provided in the upper terminus of each parallel laterally spaced elongated member 74 which can be tightened to cause the upper portion of the parallel laterally spaced elongated member 74 to snuggly embrace the lower portion of the upper vertical member 106 nested therein. Added structural support is provided by a wooden cross member 112 which interconnects the upper portion of the upper vertical members 106 of the supporting frame 72 and is secured thereto by fastener means such as screws (not illustrated).

The wooden cross member 112 supports a converging refuse inlet aperture, generally designated 114, which is defined by nestingly engaged front and rear bag supporting members 116 and 118, respectively. The front and rear bag supporting members 116 and 118 are opposed and generally "U" shaped in horizontal cross section, the free legs of which slidably engage one another to define the inlet aperture 114. A pair of opposed axially aligndd thumb screws 120 threadably engage the legs of the front bag supporting member 116, passing laterally outwardly through elongated slots 122 in the legs of the rear bag supporting member 118. When the thumb screws 120 are tightened, they cause the legs of the rear bag supporting member 118 to be trapped between the thumb screws 120 and the legs of the front bag supporting member 116.

The lower terminus of the front and rear bag supporting members 116 and 118 are of increased wall thickness as designated at 116a and 118a, respectively. An open mouthed, elongated collection bag (illustrated fragmentarily) 124 is disposed within a refuse bag receiving area, generally designated 126, which extends downwardly to the uppermost surface of the bottom bag supporting frame. The elongated collection bag 124 has its mouth rigidly held open by a lower terminus of the combined front and rear bag supporting members 116 and 118. A number of spring acting clips 128 are externally peripherally spaced about and have one end affixed to the front and rear bag supporting members 116 and 118, and depend downwardly from their attachment point in cantilever fashion. The free ends of the clips 128 are biased against the front and rear bag supporting members 116 and 118 to collectively form a bag clamping mechanism therewith. The elongated collection bag 124 is held in the illustrated position by passing the open end thereof upwardly between the spring clips 128 and the portions of the front and rear bag supporting members 116 and 118 adjacently associated therewith.

The front bag supporting member 116 extends upwardly and leftwardly substantially further than the rear bag supporting member 118. This extension is defined for the purposes of the present application as a dust pan 130. The dust pan 130 defines a refuse guiding ramp 130a (illustrated in a locally broken away section) which, when the dust pan and refuse container 70 is in the trash collecting position, guides refuse into the inlet aperture 114. Laterally spaced, longitudinally oriented left and right dust pan support webs 130L and 130R are provided to structurally reinforce the dust pan 130 as well as provide lateral refuse guidance.

The alternative embodiment of the invention, as illustrated in FIG. 4, operates as follows. The dust pan and refuse container 70 is adjustable both in vertical height as well as the area of the refuse inlet aperture 114 to accommodate elongated collection bags 124 of varying dimensions and capacities. The area of the refuse inlet aperture 114 is adjustable by loosening the thumb screws 120 and slidingly repositioning the rear bag supporting member 118 forwardly or rearwardly to assume a combined (with member 116) outer circumferential dimension which is slightly less than the mouth or opening of the elongated collection bag 124. Subsequent retightening of the thumb screws 120 assures that the new area of the inlet aperture 114 will remain the same. Note that only the rear bag supporting member 118 is displaceable with respect to the supporting frame 72. The front bag supporting member 116 is affixed to the supporting frame 72 (specifically to cross member 112) by a bridge supporting member 132 by fastening means such as screws (not illustrated). Thus, the front bag supporting member 116 is at all times maintained in the fixed orientation illustrated with respect to the upper vertical members 106.

Variations in the capacity or height of the elongated collection bag 124 can be accommodated by attaching the elongated collection bag 124 to the front and rear bag supporting members 116 and 118 via the spring clips 128, loosening the thumb screw clamp 110 and sliding the upper vertical members 106 downwardly into the parallel laterally spaced elongated members 74 until the lower most extent of the elongated collection bag 124 abuts the upper most surface of the bottom bag supporting frame. At this point, the thumb screw clamp 110 is retightened and the refuse container 70 is ready for use. The elongated collection bag is contained within the elongated collection bag receiving area 126 by the bottom and upper bag supporting frames, the access door 86, the longitudinally extending support members 92, the diagonally oriented members 98, and a pair of laterally spaced upstanding planar guide members 134 which depend from the longitudinally oriented elongated members 80. The planar guide members 134 are substantially trapezoidal in shape and are spaced substantially to the same extent as are the longitudinally oriented elongated members 80.

Once the elongated collection bag 124 is filled and the operator desires to remove it from the container 70, the thumb screws 88 are loosened, the longitudinally extending support members 92 are rotated clockwise to assume a substantially vertical orientation (as is illustrated in phantom and arrow designated 136), and the access door 86 is rotated counterclockwise to assume a substantially horizontal orientation (as is illustrated in phantom and arrow designated 138). Note that the longitudinally extending support members 92 and the access door 86 are illustrated in phantom in intermediate positions (during the process of respositioning). With the longitudinally extending support members 92 temporarily in the substantially vertical position and the access door 86 in the substantially horizontal position, the elongated collection bag 124 is freely accessible to the user from the front (left as illustrated in FIG. 4) of the refuse container 70 and can be simply removed by pulling the upper or mouth portion of the elongated collection bag 124 downwardly, disengaging it from the spring action clips 128 and over the area of increased wall thickness 116a and 118a of the front and rear bag supporting members 116 and 118, respectively. The elongated collection bag 124 can then can be tied closed if desired and freely removed forwardly from the supporting frame 72.

When fully assembled and including an elongated collection bag 124, the dust pan and refuse container 70 is employed substantially as described in the detailed description herein above relating to FIGS. 1 through 3 and a discussion thereof is deleted here to avoid duplication. The axis of the stub axle shaft 76 should be considered as equivalent to the second rotational axis B and the axis of the second stub axle shaft 82 should be deemed to be the first rotational axis designated A.

The dust pan and refuse container 70 is collapsible to minimize its space or volume requirements during storage thereof. Collapsing of the container 70 is accomplished as follows. Starting with the container 70 assembled as illustrated in solid line in FIG. 4, the thumb screws 88 are loosened slightly. The thumb screw clamp 110 is loosened and the handle 108 is lowered into the parallel laterally spaced elongated members 74, i.e. when the uppermost terminus of the parallel laterally spaced elongated members 74 abut the lowermost surface of the cross member 112. The thumb screw clamp 110 is then retightened. The user than grasps the diagonally oriented members 98 adjacent the hinge 100 and pulls upwardly and leftwardly, as illustrated in FIG. 4, to disengage the over center snap acting hinge 100 whereby the portion of the diagonally oriented member 98 on either side of the hinge 100 will become skewed with respect to one another. The screws 94, 102 and 104 are tight enough to prevent lateral displacement of the longitudinally extending support and diagonally oriented members 92 and 98, respectively, but allow their rotational displacement if not otherwise prevented. As the hinge 100 is repositioned upwardly and leftwardly, the entire assembly of the longitudinally oriented elongated and longitudinally extending support members 80 and 92, the second stub axle shaft 82, the ground contacting wheels 84, the access door 86 and the planar guide members 134 will rotate generally clockwise in a scissors fashion as will now be apparent to one skilled in the art in light of the present specification. In the fully collapsed position, the second stub axle shaft 82 will have rotated clockwise seventy or eighty degrees from the illustrated position about the stub axle shaft 76.

In the collapsed configuration, the container 70 can be easily stored or transported. To restore the container 70 to its assembled condition, the above described process is simply reversed.

The bag supporting chute 44 (as well as the front and rear bag supporting members 116 and 118) can be constructed of discrete members or alternatively integrally molded from high quality plastic, nylon or the like. Although virtually any type of material can be employed to construct the frame 12 (72), aluminum tubing is considered best and medium gage steel wire can be used for constructing the frames 26, 32 and 38 once they have been protected from corrosion such as by plating or painting. Lightweight and structural integrity are important primary design considerations in practicing the present invention.

It is to be understood that the invention has been described with reference to a specific preferred embodiment which provides the features and advantages previously described, and that such specific and alternative embodiments are susceptible of modification as will be apparent to those skilled in the art. For example, the dimensions and proportions as suggested in the drawings and specification can be significantly varied without departing from the spirit of the present invention. Accordingly, the foregoing is not to be construed in a limiting sense.

What is claimed is:

1. A portable dust pan and refuse container for supporting and transporting a flexible bag having a mouth, said portable dust pan and refuse container comprising:
   a bag supporting frame operative to distend and substantially enclose said bag in an open mouthed and elongated condition;
   means operative to rigidly hold said mouth of said bag open for receiving refuse;
   a plurality of spaced, ground contacting wheels rotatably mounted to said bag supporting frame on a common axis to permit selective rotational repositioning of said container about said common axis from a first substantially vertical refuse position to a second, substantially horizontal refuse collecting position, said ground contacting wheels remaining in contact with the ground in each of said first and second transporting positions and in all rotational positions of said frame therebetween; and
   a dust pan depending from said bag supporting frame adjacent said mouth and projecting angularly outwardly therefrom, said dust pan operating to abut the ground when said container is in said second position such that said portable dust pan and refuse container is supported by said wheels and said dust pan in said second position.

2. The dust pan and refuse container of claim 1 further comprising handle means depending substantially upwardly from said bag supporting frame to facilitate movement of said frame when in the substantially vertical refuse transporting position and to facilitate rotational repositioning of said frame about said common axis between said refuse transporting position and said refuse collecting position.

3. The dust pan and refuse container of claim 1 further comprising at least one additional wheel rotatably mounted to said bag supporting frame such as to rotate about an axis parallel to said common axis and operative to coact with said plurality of wheels to support said frame for rolling movement in said vertical refuse transporting position.

4. The dust pan and refuse container of claim 1 wherein said dust pan defines an elongated ground embracing edge at the outer terminus thereof disposed substantially parallel to the wheel axis.

5. The dust pan and refuse container of claim 1 wherein said means operative to rigidly hold said mouth of said bag open further comprises a bag support chute mounted to said bag supporting frame and spaced from said common axis a distance generally equal to the height of said bag.

6. The dust pan and refuse container of claim 1 wherein said means operative to rigidly hold said mouth of said bag open is movably interconnected with said bag supporting frame.

7. The dust pan and refuse container of claim 1 wherein said bag supporting frame comprises a plurality of pivotally interconnected frame members such that said bag supporting frame is collapsible for storage.

8. The dust pan and refuse container of claim 1 wherein said dust pan further comprises a flat elongated ground embracing member having a ground embracing edge substantially parallel to said common axis and first and second side guard members depending angularly outwardly from said flat elongated ground embracing member and coacting therewith to define a converging refuse guiding entrance to said mouth.

9. The dust pan and refuse container of claim 1 further comprising a lower bag supporting frame underlying said bag when said bag supporting frame is in said second position.

10. The dust pan and refuse container of claim 1 further comprising a bottom bag supporting frame which underlies said bag when said bag supporting frame is in said first position.

11. A portable dust pan and refuse container for supporting and transporting a flexible bag having a mouth, said portable dust pan and refuse container comprising:
   a bag supporting frame operative to distend and substantially enclose said flexible bag in an open mouthed and elongated condition;
   a plurality of spaced, ground contacting wheels rotatably mounted to said bag supporting frame on a common axis to permit selective rotational repositioning of said container about said common axis from a first substantially vertical refuse transporting position to a second, substantially horizontal refuse collecting position, said ground contacting wheels remaining in contact with the ground in each of said first and second positions and in all rotational positions of said frame therebetween;
   bag mounting means adjustably interconnected with said flexible bag supporting frame and spaced a predetermined distance from said common axis, said bag mounting means being adapted to rigidly hold said mouth of said flexible bag open for receiving refuse; and
   a dust pan depending from said bag mounting means adjacent said mouth and projecting angularly outwardly therefrom, said dust pan operating to abut the ground when said container is in said second position such that said portable dust pan and refuse container is supported by said wheels and said dust pan in said second position.

12. The portable dust pan and refuse container of claim 11 wherein said bag mounting means comprises:
   handle means movably interconnected with said bag supporting frame;
   lock means selectively operable to lock said handle means in a fixed position relative to said bag supporting frame; and
   a bag support chute mounted to said handle.

13. The portable dust pan and refuse container of claim 12 further comprising at least one additional wheel rotatably mounted to said bag supporting frame such as to rotate about an axis parallel to said common axis and operative to coact with said plurality of wheels to support said frame for rolling movement in said vertical refuse transporting position.

14. The portable dust pan and refuse container of claim 12 wherein said bag supporting frame comprises a plurality of pivotally interconnected frame members such that said bag supporting frame is collapsible for storage.

15. The portable dust pan and refuse container of claim 12 wherein said bag supporting frame further comprises a lower bag supporting portion which underlies a portion of said flexible bag when said bag supporting frame is in said second position, said handle means underlying the remaining portion of said flexible bag in said second position.

16. The portable dust pan and refuse container of claim 11 further comprising at least one additional wheel rotatably mounted to said bag supporting frame such as to rotate about an axis parallel to said common axis and operative to coact with said plurality of wheels to support said frame for rolling movement in said vertical refuse transporting position.

17. The portable dust pan and refuse container of claim 11 wherein said bag mounting means further comprises a bag support chute mounted to said bag supporting frame and spaced from said common axis a distance generally equal to the height of said flexible bag.

18. The portable dust pan and refuse container of claim 11 wherein said bag supporting frame comprises a plurality of pivotally interconnected frame members such that said bag supporting frame is collapsible for storage.

19. The portable dust pan and refuse container of claim 11 wherein said dust pan further comprises a flat elongated ground embracing member having a ground embracing edge substantially parallel to said common axis and first and second side guard members depending angularly outwardly from said flat elongated ground embracing member and coacting therewith to define a converging refuse guiding entrance to said mouth.

20. The dust pan and refuse container of claim 11 further comprising a bottom bag supporting frame which underlies said flexible bag when said bag supporting frame is in said first position.

* * * * *

UNITED STATES PATENT AND TRADEMARK OFFICE
CERTIFICATE OF CORRECTION

PATENT NO. : 4,442,567
DATED : April 17, 1984
INVENTOR(S) : John P. Pravettone

It is certified that error appears in the above-identified patent and that said Letters Patent is hereby corrected as shown below:

Column 2, line 51, delete "disclose" and insert ---- discloses ----.

Column 3, line 2, delete "of a common axis to permit".

Column 3, line 3, delete "selective rotational repositioning of the frame".

Column 7, line 12, delete "mouht" and insert ---- mouth ----.

Column 9, line 24, delete "aligndd" and insert ---- aligned ----.

Column 12, line 22, delete "transporting".

Signed and Sealed this

Twenty-eighth Day of August 1984

[SEAL]

Attest:

GERALD J. MOSSINGHOFF

Attesting Officer

Commissioner of Patents and Trademarks